US012749253B2

(12) United States Patent
Wang

(10) Patent No.: US 12,749,253 B2
(45) Date of Patent: Sep. 29, 2026

(54) METHOD, AND APPARATUS, DEVICE, AND STORAGE MEDIUM FOR GENERATING EFFECT IMAGE

(71) Applicant: Beijing Zitiao Network Technology Co., Ltd., Beijing (CN)

(72) Inventor: Shengnan Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 124 days.

(21) Appl. No.: 18/833,391

(22) PCT Filed: Jan. 17, 2023

(86) PCT No.: PCT/CN2023/072513
§ 371 (c)(1),
(2) Date: Jul. 26, 2024

(87) PCT Pub. No.: WO2023/143224
PCT Pub. Date: Aug. 3, 2023

(65) Prior Publication Data

US 2025/0104322 A1 Mar. 27, 2025

(30) Foreign Application Priority Data

Jan. 28, 2022 (CN) ........................ 202210106673.X

(51) Int. Cl.
*G06T 15/00* (2011.01)
*G06T 13/40* (2011.01)

(52) U.S. Cl.
CPC .............. *G06T 15/00* (2013.01); *G06T 13/40* (2013.01); *G06T 2210/44* (2013.01)

(58) Field of Classification Search
CPC ..... G06T 15/00; G06T 13/40; G06T 2210/44; G06T 3/00; G06T 3/04
See application file for complete search history.

(56) References Cited

U.S. PATENT DOCUMENTS 9,013,489 B2 * 4/2015 Evertt .................. A63F 13/655
345/473
10,678,849 B1 * 6/2020 Ouimet ............... G06F 16/5866
(Continued)

FOREIGN PATENT DOCUMENTS

CN 109376671 A 2/2019
CN 112766027 A 5/2021
(Continued)

OTHER PUBLICATIONS

International Patent Application No. PCT/CN2023/072513; Int'l Search Report; dated Apr. 13, 2023; 2 pages.

*Primary Examiner* — Daniel F Hajnik
*Assistant Examiner* — Joshua Jungwook Suo
(74) *Attorney, Agent, or Firm* — BakerHostetler

(57) ABSTRACT

Examples of the disclosure disclose a method and apparatus for generating an effect image, a device, and a storage medium. The method includes: acquiring a character appearance image to be morphed, and a first morphing point in the character appearance image to be morphed; acquiring a second morphing point in a character appearance template; determining a target morphing point according to the second morphing point and the first morphing point; and generating a character appearance morphing effect image based on the target morphing point.

20 Claims, 4 Drawing Sheets

(56) References Cited

U.S. PATENT DOCUMENTS

| | | | | |
|---|---|---|---|---|
| 11,190,689 | B1 * | 11/2021 | Wang | H04N 23/683 |
| 2011/0115786 | A1 * | 5/2011 | Mochizuki | G06T 11/10<br>345/419 |
| 2020/0319015 | A1 * | 10/2020 | Kamiyama | A61B 5/7264 |

FOREIGN PATENT DOCUMENTS

| | | | |
|---|---|---|---|
| CN | 112766215 | A | 5/2021 |
| CN | 113674139 | A | 11/2021 |

* cited by examiner

METHOD, AND APPARATUS, DEVICE, AND STORAGE MEDIUM FOR GENERATING EFFECT IMAGE

CROSS-REFERENCE TO RELATED APPLICATION(S)

The disclosure is a national stage application filed under 35 U.S.C. 371 based on International Patent Application No. PCT/CN2023/072513, filed Jan. 17, 2023, which claims the priority to Chinese Patent Application No. 202210106673.X, filed with the Chinese Patent Office on Jan. 28, 2022, which are incorporated herein in their entireties by reference.

FIELD

Examples of the disclosure relate to the technical field of image processing, and relate to, for example, method apparatus, device, and storage medium for generating effect image.

BACKGROUND

As the network technology and digital image acquisition technology develop, people are more willing to share their pictures or videos on the network. For better interaction effects, character appearances in the pictures will be morphed sometimes.

In the case of two-dimensional character appearance images, a traditional machine learning method is used. Specifically, change parameters are obtained through training, based on which character appearances are morphed. However, the traditional method depends on masses of training results, and is likely to result in a poor morphing effect on the character appearances due to incomplete traversal of training models.

SUMMARY

Examples of the disclosure provide method and apparatus, device, and storage medium for generating effect image, through which a character appearance in an image is morphed, and a morphing effect on the character appearance may be improved.

In a first aspect, the example of the disclosure provides a method for generating an effect image. The method includes:

- acquiring an image of a character appearance to be morphed, and a first morphing point in the character appearance image to be morphed;
- acquiring a second morphing point in a character appearance template;
- determining a target morphing point according to the second morphing point and the first morphing point; and
- generating a character appearance morphing effect image based on the target morphing point.

In a second aspect, the example of the disclosure further provides an apparatus for generating an effect image. The apparatus includes:

- a to-be-morphed character appearance image acquisition module configured to acquire a character appearance image to be morphed, and a first morphing point in the character appearance image to be morphed;
- a second morphing point acquisition module configured to acquire a second morphing point in a character appearance template;

- a target morphing point determination module configured to determine a target morphing point according to the second morphing point and the first morphing point; and
- a character appearance morphing effect image generation module configured to generate a character appearance morphing effect image based on the target morphing point.

In a third aspect, the example of the disclosure provides an electronic device. The electronic device includes:

- one or more processors; and
- a memory configured to store one or more programs, where
- the one or more processors are caused to implement the method for generating an effect image according to the example of the disclosure when the one or more programs are executed by the one or more processors.

In a fourth aspect, the example of the disclosure further provides a computer-readable storage medium. The computer-readable medium stores a computer program, where the program implements the method for generating an effect image according to the example of the disclosure when executed by a processor.

DETAILED DESCRIPTION OF EMBODIMENTS

It should be understood that a plurality of steps described in a method embodiment of the disclosure can be executed in different orders and/or in parallel. Further, the method embodiment can include an additional step and/or omit a shown step, which does not limit the scope of the disclosure.

As used herein, the terms "comprise" and "include" and their variations are open-ended, that is, "comprise but not limited to" and "include but not limited to". The term "based on" indicates "at least partially based on". The term "an example" indicates "at least one example". The term "another example" indicates "at least one another example". The term "some examples" indicates "at least some examples". Related definitions of other terms will be given in the following description.

It should be noted that concepts such as "first" and "second" mentioned in the disclosure are merely used to distinguish different apparatuses, modules or units, rather than limit an order or interdependence of functions executed by these apparatuses, modules or units.

It should be noted that modifications with "a", "an" and "a plurality of" mentioned in the disclosure are schematic rather than limitative, and should be understood by those skilled in the art as "one or more" unless otherwise definitely indicated in the context.

Names of messages or information exchanged among a plurality of apparatuses in the embodiment of the disclosure are merely used for illustration rather than limitation to the scope of the messages or information.

Figure 1:
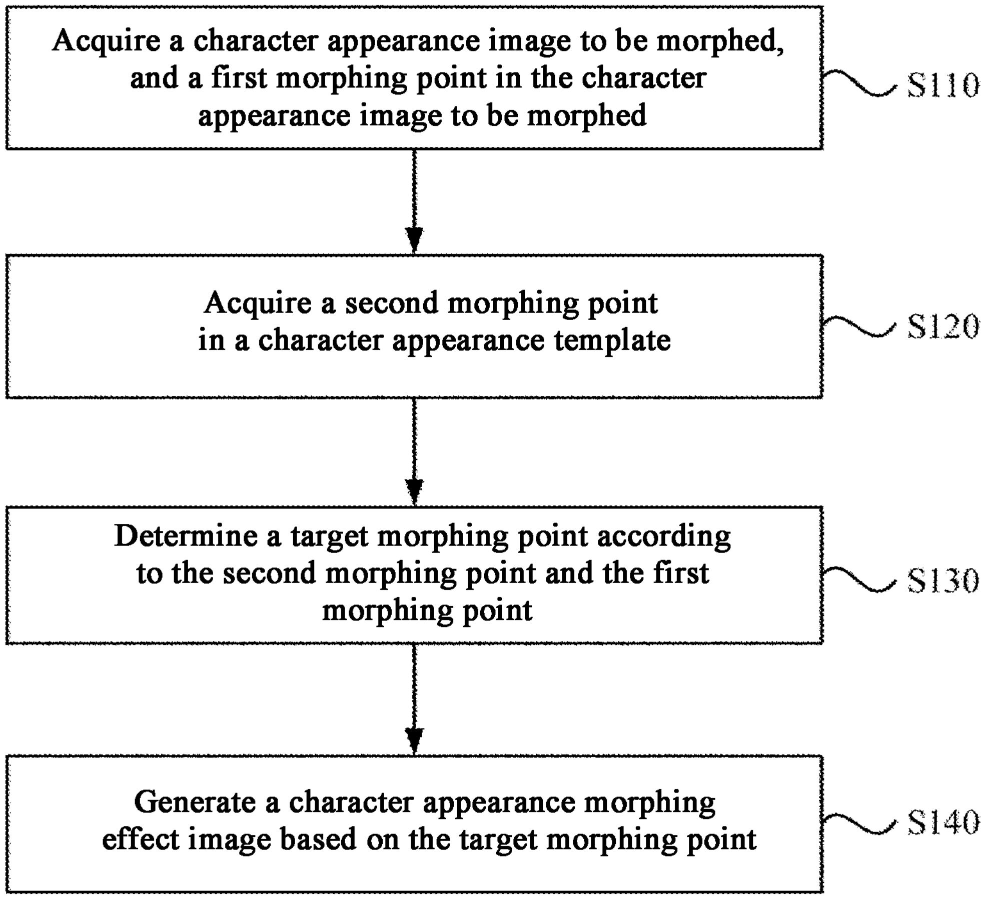
FIG. 1 is a flowchart of a method for generating an effect image according to an example of the disclosure.

FIG. 1 is a flowchart of a method for generating an effect image according to an example of the disclosure. This example is applicable to the case of morphing a character appearance. The method may be executed by an apparatus for generating an effect image. The apparatus may be composed of hardware and/or software, and may generally be integrated into a device that has an effect image generation function. The device may be an electronic device such as a server, a mobile terminal or a server cluster. As shown in FIG. 1, the method includes:

Step 110: a character appearance image to be morphed, and a first morphing point in the character appearance image to be morphed are acquired.

The character appearance to be morphed may be obtained by acquiring a static character appearance image, or from an image obtained through frame hold on acquired images in a process of continuously acquiring character appearance images, or an image that includes a character appearance and is acquired from a local database or network database. A method for acquiring the character appearance image to be morphed is not limited herein.

For example, the method for acquiring the character appearance image to be morphed may be as follows: an image in a picture is scanned in a set scanning mode in a process of acquiring the character appearance image; and frame hold is performed on a scanned area until the entire picture is scanned and the character appearance image to be morphed is obtained.

In this example, the character appearance image may be acquired at a set frequency, and the image in the picture may be scanned at a set speed. The frame hold on the scanned area may be understood as holding a picture of the scanned area. A set number of points may be selected from key points in the character appearance as the first morphing points, for example, the first morphing point may include: a forehead center point, a nasal tip point, a chin center point, left and right cheek points, etc. In this example, the frame hold is performed on the scanned area until the entire picture is scanned and the character appearance image to be morphed is obtained, such that diversity and interest of acquisition of the character appearance image to be morphed may be improved.

The set scanning mode includes scanning with one or more of scanning lines. One scanning line is controlled to scan the image in the picture in a set direction in response to determining the scanning with a plurality of scanning lines. A sub-area scanned by each scanning line is determined in response to determining the scanning with a plurality of scanning lines, and the plurality of scanning lines are controlled to scan the image in the picture in a set direction and within corresponding sub-areas.

Figure 2A:
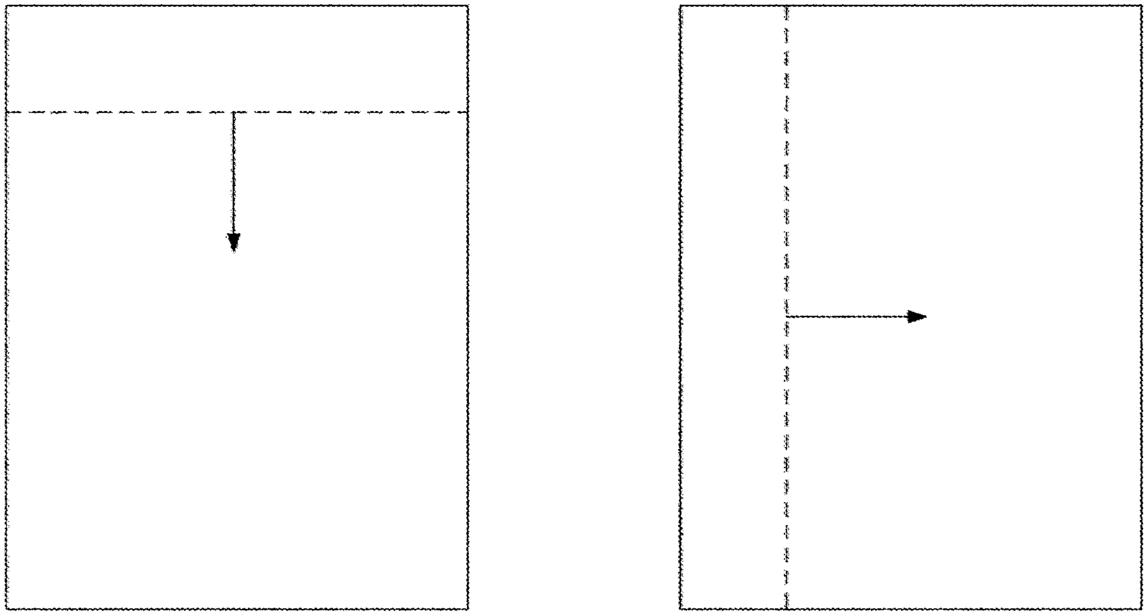
FIG. 2*a* is an illustrative diagram of scanning a picture with one scanning line according to an example of the disclosure.

The set direction may be a direction in which the scanning line may be guaranteed to scan the entire picture, for example, from top to bottom, from bottom to top, from left to right or from right to left, etc., and the scanning direction of the scanning line is not limited herein. Illustratively, FIG. 2*a* is an illustrative diagram of scanning a picture with one scanning line according to this example. As shown in FIG. 2*a*, a scanning line scans a left image from top to bottom, and a scanning line scans a right image from left to right.

Figure 2B:
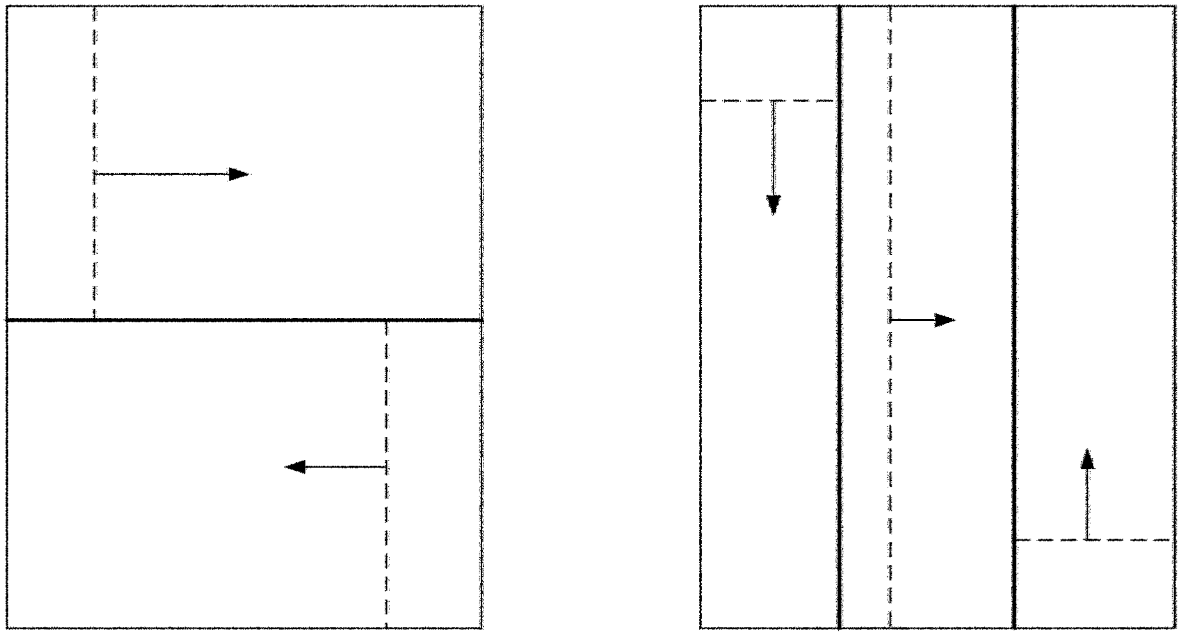
FIG. 2*b* is an illustrative diagram of scanning a picture with a plurality of scanning lines according to an example of the disclosure.

A number of the plurality of scanning lines may be 2, 3, 4, etc. A sub-area may be understood as a sub-area obtained by dividing a current picture. For example, the current picture is divided into upper and lower sub-areas, left and right sub-areas, three horizontal or vertical sub-areas, or upper-left, lower-left, upper-right, lower-right sub-areas, and the sub-areas are divided in different ways herein. In addition, the number of sub-areas is the same as the number of scanning lines. In each sub-area, the scanning direction of the scanning line may be any direction in which the scanning line may be guaranteed to scan the entire sub-area, and scanning directions and scanning speeds of the scanning lines of sub-areas may be the same or different. That is, the scanning directions and the scanning speeds of the scanning lines of the plurality of sub-areas are independent of one another and do not influence one another. Illustratively, FIG. 2*b* is an illustrative diagram of scanning a picture with a plurality of scanning line according to this example. As shown in FIG. 2*b*, a picture in a left image is divided into upper and lower sub-areas. The scanning line scans the upper sub-area from left to right, and the scanning line scans the lower sub-area from right to left. The right image will be divided into left, middle and right sub-areas. The scanning line scans the left sub-area from top to bottom, the scanning line scans the middle sub-area from left to right, and the scanning line scans the right sub-area from bottom to top. In this example, the scanning mode may be selected according to demand of a user. FIG. 2*b* is merely an illustrative diagram. In an actual scenario, the area dividing line is not displayed for the aesthetic quality of the image. One or more of scanning lines are used to scan the picture including the character appearance, to obtain the character appearance image to be morphed, such that diversity and interest of acquisition of the character appearance image to be morphed may be improved.

For example, the frame hold may be performed on the scanned area by a method as follows: set key points of a character appearance in a picture are traversed for a scanned current frame. Whether the traversed set key point is fixed is determined. Whether the traversed set key point is within the scanned area is determined based on a determination result that the traversed set key point is not fixed. The traversed set key point is fixed based on a determination result that the traversed set key point is within the scanned area, and the set key point that is fixed is determined as the first morphing point.

A set key point is selected from the key points of the character appearance as the key point. The fixing the set key point may be understood as that the set key point is already within an area subjected to frame hold. The fixing the traversed set key point may be understood that coordinate information of the set key point is kept unchanged. For the set key point that is not fixed, whether the traversed set key point is within the scanned area may be determined by a method as follows: the coordinate information of the traversed set key point is compared with a position of a current scanning line, so as to determine whether the set key point is within the scanned area. It is assumed that the scanning line performs scan from top to bottom, an ordinate of the traversed set key point tis compared with an ordinate of the scanning line, and in response to determining that the ordinate of the traversed set key point is smaller than the ordinate of the scanning line, the traversed set key point is within the scanned area. It is assumed that the scanning line performs scan from left to right, an abscissa of the traversed set key point is compared with an abscissa of the scanning line, and in response to determining that the abscissa of the traversed set key point is smaller than the abscissa of the scanning line, the traversed set key point is within the scanned area. A method in which the coordinate information of the traversed set key point is compared with the position of the current scanning line is adjusted according to a scanning direction of the scanning line, which will not be repeated herein. In this example, the set key point within the scanned area is fixed as the first morphing point, such that frame hold may have performed on an acquired picture, and the character appearance image to be morphed may be accurately obtained.

Step 120: a second morphing point is acquired in a character appearance template.

The character appearance template may be a human face image designed in advance by technicians, and the second morphing point corresponds to the first morphing point in a one-to-one manner.

For example, before the step that a second morphing point is acquired in a character appearance template, the method further includes: whether the first morphing point that is acquired in the character appearance image to be morphed is complete is determined. Under the condition that a determination result that the first morphing point that is acquired in the character appearance image to be morphed is complete indicates that a complete character appearance is acquired by the current picture, subsequent morphing may be performed. Under the condition that a determination result that the first morphing point that is acquired in the character appearance image to be morphed is incomplete indicates that a complete character appearance is not acquired by the current picture, subsequent morphing may not be performed, and the character appearance image to be morphed needs to be re-acquired.

Step 130: a target morphing point is determined according to the second morphing point and the first morphing point.

The step that the target morphing point is determined according to the second morphing point and the first morphing point for adjustment may be understood as that coordinate information of the target morphing point is determined according to coordinate information of the second morphing point and coordinate information of the first morphing point. In this example, the character appearance template is in a camera coordinate system, and the character appearance image to be morphed is in a screen coordinate system, it is necessary to convert the character appearance template into the screen coordinate system accordingly, to facilitate determination of the target morphing point for adjustment.

For example, the method for determining the target morphing point according to the second morphing point and the first morphing point includes: a virtual standard character appearance is generated according to character appearance information of the character appearance image to be morphed and the character appearance template. A third morphing point in the virtual standard character appearance is determined. The target morphing point is determined according to the first morphing point, the second morphing point and the third morphing point.

The character appearance information includes a first eye distance and a first central key point. The middle key point may be a key point in a center of the character appearance, such as a nasal tip key point. The virtual standard character appearance may be a virtual standard character appearance in the screen coordinate system, and the third morphing point also corresponds to the first morphing point in a one-to-one manner. In this example, the first morphing point is adjusted based on the third morphing point in the virtual standard character appearance, and the second morphing point in the character appearance template, such that accuracy of the adjusted first morphing point may be improved.

For example, the method for the virtual standard character appearance generated according to the character appearance information of the character appearance image to be morphed and the character appearance template may be: a second central key point in the character appearance template is aligned with the first central key point; and aligned eye distance in the character appearance template is adjusted according to the first eye distance to obtain the virtual standard character appearance.

Figure 3:
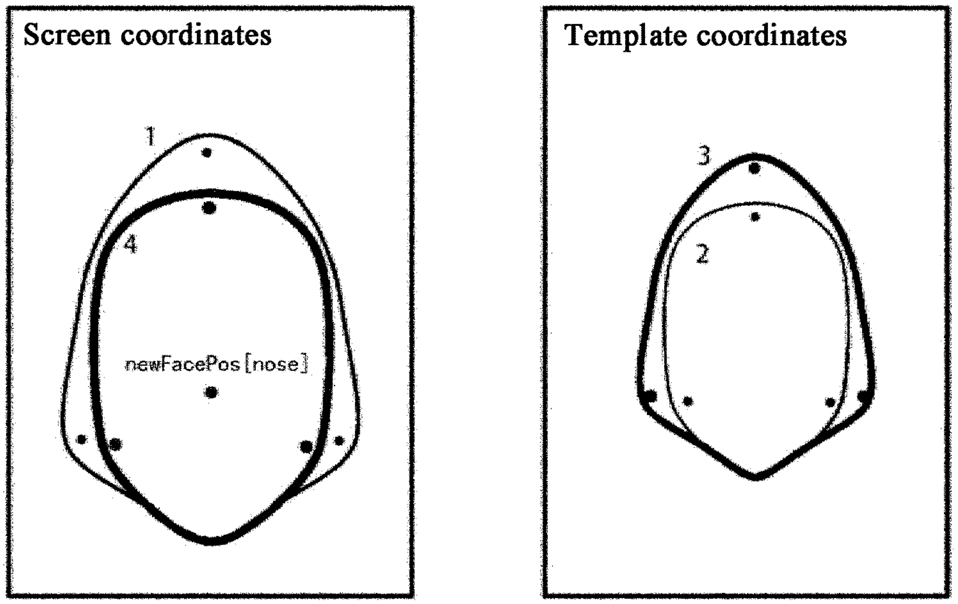
FIG. 3 is an illustrative diagram of generating a virtual standard character appearance according to an example of the disclosure.

For example, a nasal tip key point in the character appearance template is aligned with the nasal tip key point in the character appearance to be morphed, and then the aligned eye distance in the character appearance template is adjusted in an equal proportion on a screen according to the first eye distance of the character appearance to be morphed, such that the virtual standard character appearance is obtained. Illustratively, FIG. 3 is an illustrative diagram of generating a virtual standard character appearance according to this example of the disclosure. As shown in FIG. 3, a first face is a character appearance to be morphed on the screen, a second face is a character appearance template, a fourth face is a virtual standard character appearance, and a third face is a character appearance after morphing. As shown in FIG. 3, a nasal tip key point of the fourth face is aligned with a nasal tip key point (indicated by newFacePos[nose] in the figure) of the first face, an eye distance of the fourth face is the same as an eye distance of the first face, and a shape of the fourth face is the same as a shape of the second face. In this example, the aligned eye distance in the character appearance template is adjusted according to the first eye distance, such that the virtual standard character appearance generated adapts to the character appearance to be morphed, and accuracy of morphing is improved.

For example, the method for determining the third morphing point in the virtual standard character appearance may include: the third morphing point is determined according to the first central key point, the second central key point, the second morphing point, the first eye distance, and the eye distance in the character appearance template.

It is assumed that the first central key point is expressed as Pnose, the second central key point is expressed as Tnose, the second morphing point is expressed as Ti, the third morphing point is expressed as Ui, the first eye distance is expressed as currentEyeDistance, and the eye distance in the character appearance template is expressed as templetEyeDistance, the third morphing point may be determined according to the following formula:

$$\frac{U_i - P_{nose}}{T_i - T_{nose}} = \frac{currentEyeDistance}{templetEyeDistance}$$

In this example, the ratio of a distance between the morphing point and the central key point to the eye distance is used to determine the third morphing point in the virtual standard character appearance, such that determination accuracy of the third morphing point is improved.

For example, the target morphing point may be determined according to the first morphing point, the second morphing point and the third morphing point in a process as follows: the target morphing point is determined according to the first central key point, the second central key point, the third central key point, the first eye distance, and the eye distance in the character appearance template.

The first morphing point may be expressed as Pi, and the target morphing point is expressed as Qi. Then the target morphing point may be determined by the following formula:

$$\frac{P_i - U_{nose}}{Q_i - T_{nose}} = \frac{currentEyeDistance}{templetEyeDistance}$$

Figure 4:
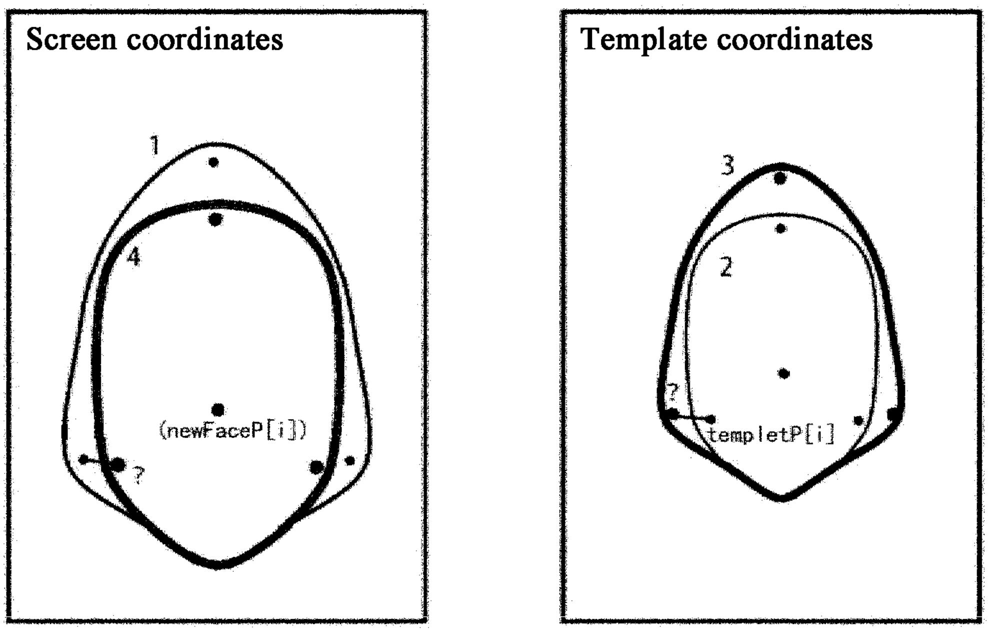
FIG. 4 is an illustrative diagram of determining a target morphing point according to an example of the disclosure.

Illustratively, FIG. 4 is an illustrative diagram of determining a target morphing point according to this example. As shown in FIG. 4, a left diagram shows a process of determining the third morphing point in the virtual standard character appearance, and a right diagram shows a process of determining the target morphing point. In this example, the ratio of a distance between the target morphing point and the second morphing point to the eye distance in the character appearance template is used to determine the target morphing point, such that determination accuracy of the third morphing point is improved.

In this example, in order to prevent a face from being excessively morphed, it is necessary to adjust the target morphing point. For example, the method further includes: an ellipse of a set size is constructed by using the first morphing point as a center after the target morphing point is obtained. A point of intersection of a connection line connecting the first morphing point and the target morphing point with the ellipse is obtained to determine the point of intersection as a final target morphing point in response to determining that the target morphing point falls outside the ellipse. The target morphing point is retained in response to determining that the target morphing point falls within the ellipse.

The size of the ellipse may be set in advance according to morphing demand. In this example, the method for determining whether the target morphing point falls outside the ellipse may include: a distance (that is, D1) between the first morphing point and the target morphing point is computed. A distance (that is, D2) between the first morphing point and a point, in the same direction, on the ellipse is computed. Then D1 and D2 are compared. If D1 is longer than D2, the target morphing point falls outside the ellipse. Alternatively, determination may be performed by plugging coordinates of the target morphing point into a mathematical expression of the ellipse according to a mathematical principle of the ellipse, which will not be repeated herein. In a technical solution of this example, the point of intersection is determined as the final target morphing point in response to determining that the target morphing point falls outside the ellipse, such that the face can be prevented from being excessively morphed.

Step 140: a character appearance morphing effect image is generated based on the target morphing point.

For example, after the target morphing point is obtained, the target morphing point is entered into a set morphing algorithm, and the character appearance morphing effect image may be obtained. The set morphing algorithm may be any morphing algorithm in the related art, such as FaceStretch algorithm, which is not limited in this example.

According to a technical solution of the example of the disclosure, the character appearance image to be morphed, and the first morphing point in the character appearance image to be morphed are acquired. The second morphing point is acquired in the character appearance template. The target morphing point is determined according to the second morphing point and the first morphing point. The character appearance morphing effect image is generated based on the target morphing point. According to the method for generating an effect image provided by the example of the disclosure, the target morphing point is determined according to the second morphing point in the character appearance template, and the first morphing point, and the character appearance morphing effect image is generated based on the target morphing point. In this way, a character appearance in an image may be morphed, and a morphing effect of the character appearance may be improved.

Figure 5:
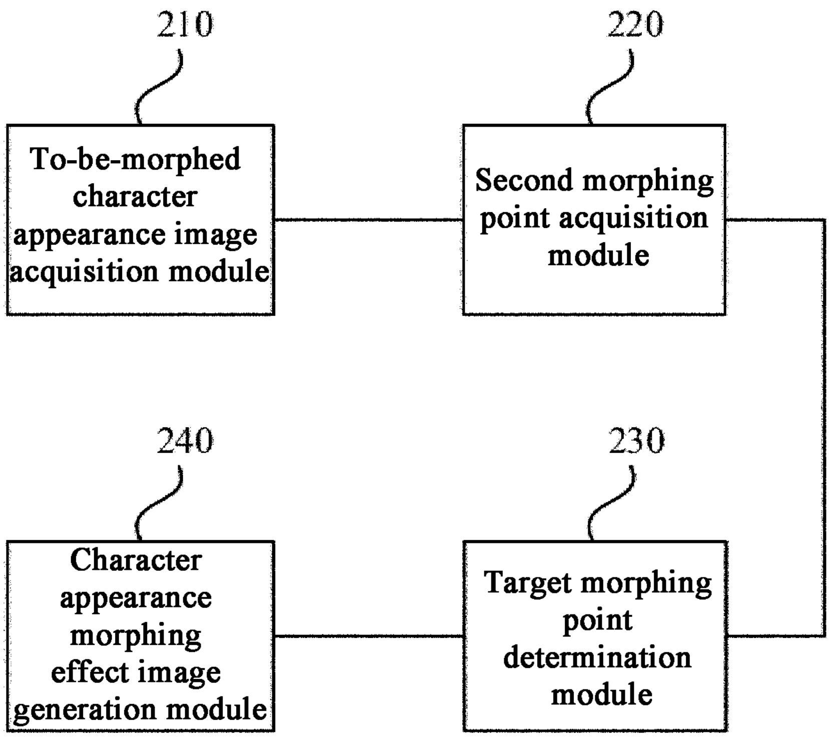
FIG. 5 is a schematic structural diagram of an apparatus for generating an effect image according to an example of the disclosure.

FIG. 5 is a schematic structural diagram of an apparatus for generating an effect image according to an example of the disclosure. As shown in FIG. 5, the apparatus includes:

a to-be-morphed character appearance image acquisition module 210 configured to acquire a character appearance image to be morphed, and a first morphing point in the character appearance image to be morphed;

a second morphing point acquisition module 220 configured to acquire a second morphing point in a character appearance template;

a target morphing point determination module 230 configured to determine a target morphing point according to the second morphing point and the first morphing point; and a character appearance morphing effect image generation module 240 configured to generate a character appearance morphing effect image based on the target morphing point.

For example, the to-be-morphed character appearance image acquisition module 210 is configured to acquire the character appearance image to be morphed by a method as follows:

An image in a picture is scanned in a set scanning mode in a process of acquiring a character appearance image.

Frame hold is performed on a scanned area until the entire picture is scanned and the character appearance image to be morphed is obtained.

For example, the to-be-morphed character appearance image acquisition module 210 is configured to perform frame hold on the scanned area by a method as follows:

Set key points of a character appearance in a picture are traversed for a scanned current frame.

Whether a traversed set key point is fixed is determined;

Whether the traversed set key point is within the scanned area is determined based on a determination result that the traversed set key point is not fixed.

The traversed set key point is fixed based on a determination result that the traversed set key point is within the scanned area.

For example, the set scanning mode includes scanning with one or more of scanning lines.

The to-be-morphed character appearance image acquisition module 210 is configured to scan the image in the picture in the set scanning mode in the process of acquiring the character appearance image by a method as follows:

In response to determining the scanning with one scanning line, the one scanning line is controlled to scan the image in the picture in a set direction.

In response to determining the scanning with a plurality of scanning lines, a sub-area scanned by each scanning line is determined, and the plurality of scanning lines are controlled to scan the image in the picture in a set direction and within corresponding sub-areas.

For example, the target morphing point determination module 230 is configured to determine the target morphing point according to the second morphing point and the first morphing point by a method as follows:

A virtual standard character appearance is generated according to character appearance information of the character appearance image to be morphed and the character appearance template.

A third morphing point in the virtual standard character appearance is determined.

The target morphing point is determined according to the first morphing point, the second morphing point and the third morphing point.

For example, the character appearance information includes a first eye distance and a first central key point. The target morphing point determination module 230 is configured to generate the virtual standard character appearance according to the character appearance information of the character appearance image to be morphed and the character appearance template by a method as follows:

A second central key point in the character appearance template is aligned with the first central key point.

According to the first eye distance, an aligned eye distance in the character appearance template is adjusted, and the virtual standard character appearance is obtained.

For example, the target morphing point determination module 230 is configured to determine the third morphing point in the virtual standard character appearance by a method as follows:

The third morphing point is determined according to the first central key point, the second central key point, the second morphing point, the first eye distance, and the eye distance in the character appearance template.

For example, the target morphing point determination module 230 is configured to determine the target morphing point according to the first morphing point, the second morphing point and the third morphing point by a method as follows:

The target morphing point is determined according to the first morphing point, the second morphing point, the third morphing point, the first eye distance, and the eye distance in the character appearance template.

For example, the apparatus for generating an effect image further includes a target morphing point adjustment module configured to:

- construct an ellipse of a set size by using the first morphing point as a center;
- obtain a point of intersection of a connection line connecting the first morphing point and the target morphing point with the ellipse to determine the point of intersection as a final target morphing point in response to determining that the target morphing point falls outside the ellipse; and
- retain the target morphing point in response to determining that the target morphing point falls within the ellipse.

The apparatus may execute the methods according to all example of the disclosure, and has corresponding function modules for executing the methods and beneficial effects. For technical details that are not described in detail in this example, reference can be made to the methods according to all the examples of the disclosure.

Figure 6:
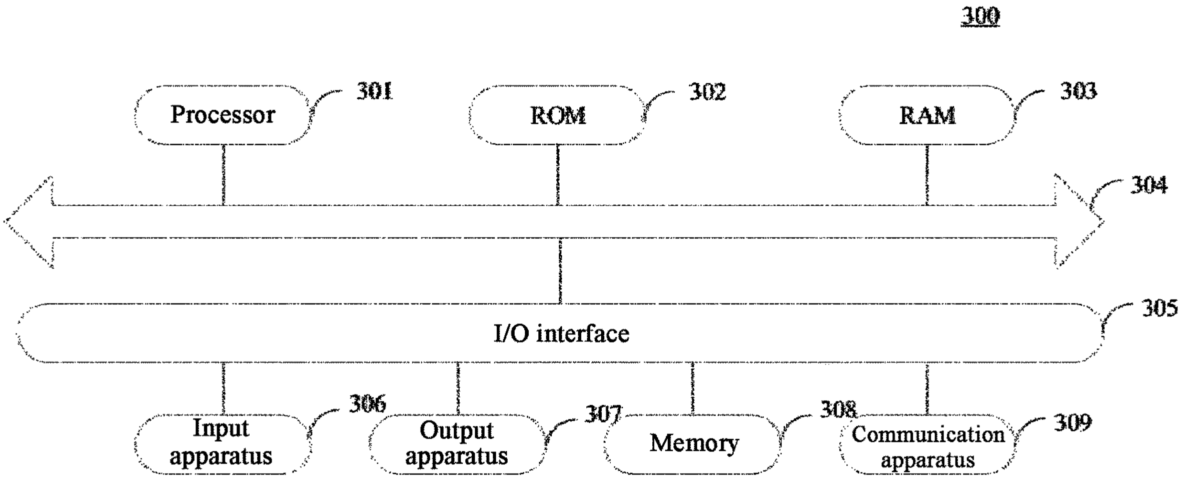
FIG. 6 is a schematic structural diagram of an electronic device according to an example of the disclosure.

With reference to FIG. 6, a schematic structural diagram of an electronic device 300 applied to implementation of the example of the disclosure is shown. The electronic device in the example of the disclosure may include, but is not limited to, a mobile terminal such as a mobile phone, a notebook computer, a digital broadcast receiver, a personal digital assistant (PDA), a pad, a portable multimedia player (PMP), a vehicle-mounted terminal (such as a vehicle-mounted navigation terminal), a fixed terminal such as a digital TV and a desktop computer or various forms of servers, such as an independent server or a server cluster. The electronic device shown in FIG. 6 is merely an example, and should not be constructed as limitation to functions and application scopes of the example of the disclosure.

As shown in FIG. 6, the electronic device 300 may include a processor 301 (for example, a central processing unit, a graphics processing unit, etc.), which may execute various appropriate actions and processing according to a program stored in a read-only memory (ROM) 302 or loaded from a memory 305 to a random access memory (RAM) 303.

The RAM 303 may further store various programs and data required for the operation by the electronic device 300. The processor 301, the ROM 302, and the RAM 303 are connected to one another through a bus 304. An input/output (I/O) interface 305 is also connected to the bus 304.

Generally, the following apparatuses may be connected to the I/O interface 305: an input apparatus 306 such as a touch screen, a touch pad, a keyboard, a mouse, a camera, a microphone, an accelerometer and a gyroscope, an output apparatus 307 such as a liquid crystal display (LCD), a speaker and a vibrator, a memory 308 such as a magnetic tape and a hard disk, and a communication apparatus 309. The communication apparatus 309 may allow the electronic device 300 to be in wireless or wired communication with other devices for data exchange. Although the electronic device 300 having various apparatuses is shown in FIG. 6, it should be understood that all the apparatuses shown are not required to be implemented or provided. More or fewer apparatuses may be alternatively implemented or provided.

According to the example of the disclosure, a process described above with reference to the flowchart may be implemented as a computer software program. For example, the example of the disclosure includes a computer program product. The computer program product includes a computer program carried on a computer-readable medium, and the computer program includes program codes for executing a recommended method for words. In such an example, the computer program may be downloaded and mounted from the network through the communication apparatus 309, or mounted from the memory 305, or mounted from the ROM 302. When executed by the processor 301, the computer program executes the above functions defined in the method according to the example of the disclosure.

It should be noted that the computer-readable medium described above in the disclosure may be a computer-readable signal medium or a computer-readable storage medium or any one of their combinations. For example, the computer-readable storage medium may be, including but not limited to, an electric, magnetic, optical, electromagnetic, infrared, or semiconductor system, apparatus or device, or their any combination. More specific examples of the computer-readable storage medium may include, but is not limited to, an electrical connection having one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or their any suitable combination. In the disclosure, the computer-readable storage medium may be any tangible medium including or storing a program, and the program may be used by or in combination with an instruction execution system, apparatus or device. In the disclosure, the computer-readable signal medium may include a data signal propagated in a baseband or as part of a carrier wave, in which a computer-readable program code is carried. This propagated data signal may have a plurality of forms, including but not limited to an electromagnetic signal, an optical signal or their any suitable combination. The computer-readable signal medium may be further any computer-readable medium other than the computer-readable storage medium, and the computer-readable medium may send, propagate or transmit a program used by or in combination with the instruction execution system, apparatus or device. A program code included in the computer-readable medium may be transmitted by any suitable medium, including but not limited to: a wire, an optical cable, a radio frequency (RF) medium, etc., or their any suitable combination. The computer-readable storage medium may be a non-transient computer-readable storage medium.

In some embodiments, a client side and a server may communicate by using any network protocol such as the hypertext transfer protocol (HTTP) that is currently known or will be developed in future, and may be interconnected to digital data communication (for example, a communication network) in any form or medium. Examples of the communication network include a local area network ("LAN"), a wide area network ("WAN"), internet work (for example, the Internet), an end-to-end network (for example, ad hoc end-to-end network), and any network that is currently known or will be developed in future.

The computer-readable medium may be included in the electronic device, or exist independently without being fitted into the electronic device.

The computer-readable medium carries one or more programs, and when the one or more programs are executed by an electronic device, the electronic device is caused to: acquire a character appearance image to be morphed, and a first morphing point in the character appearance image to be morphed; acquire a second morphing point in a character appearance template; determine a target morphing point according to the second morphing point and the first morphing point; and generate a character appearance morphing effect image based on the target morphing point.

Computer program codes for executing the operations of the disclosure may be written in one or more programming languages or their combinations, and the programming languages include, but are not limited to, object-oriented programming languages including Java, Smalltalk, C++, and further include conventional procedural programming languages including "C" language or similar programming languages. The program codes may be completely executed on a computer of the user, partially executed on the computer of the user, executed as an independent software package, partially executed on the computer of the user and a remote computer separately, or completely executed on the remote computer or the server. In the case of involving the remote computer, the remote computer may be connected to the computer of the user through any type of network, including a local area network (LAN) or a wide area network (WAN), or may be connected to an external computer (for example, through the Internet provided by an Internet service provider).

The flowcharts and block diagrams in the accompanying drawings illustrate the architectures, functions and operations that may be implemented by the systems, the methods and the computer program products according to various examples of the disclosure. In this regard, each block in the flowchart or block diagram may represent one module, one program segment, or a part of codes that includes one or more executable instructions for implementing specified logical functions. It should also be noted that in some alternative implementations, the functions indicated in the blocks may occur in an order different than those noted in the accompanying drawings. For example, two blocks represented in succession may actually be executed in substantially parallel, and may sometimes be executed in a reverse order depending on the functions involved. It should also be noted that each block in the block diagram and/or flowchart, and a combination of blocks in the block diagram and/or flowchart may be implemented by a specific hardware-based system that executes specified functions or operations, or may be implemented by a combination of specific hardware and computer instructions.

The units involved in the example of the disclosure may be implemented by software or hardware. The name of the unit does not limit the unit itself in some cases.

The functions described above herein may be executed at least in part by one or more hardware logic components. For example, illustrative types of hardware logic components that may be used include: a field programmable gate array (FPGA), an application specific integrated circuit (ASIC), an application specific standard product (ASSP), a system on chip (SOC), a complex programmable logic device (CPLD), etc. in a non-restrictive way.

In the context of the disclosure, a machine-readable medium may be a tangible medium, and may include or store a program that is used by or in combination with the instruction execution system, apparatus or device. The machine-readable medium may be a machine-readable signal medium or a machine-readable storage medium. The machine-readable medium may include, but is not limited to, an electric, magnetic, optical, electromagnetic, infrared, or semiconductor system, apparatus or device, or their any suitable combination. More specific examples of the machine-readable storage medium may include an electrical connection based on one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or their any suitable combination.

According to one or more examples of the disclosure, a method for generating an effect image includes:

A character appearance image to be morphed, and a first morphing point in the character appearance image to be morphed are acquired.

A second morphing point is acquired in a character appearance template.

A target morphing point is determined according to the second morphing point and the first morphing point.

A character appearance morphing effect image is generated based on the target morphing point.

For example, the step that a character appearance image to be morphed includes:

An image in a picture is scanned in a set scanning mode in a process of acquiring a character appearance image.

Frame hold is performed on a scanned area until the entire picture is scanned and the character appearance image to be morphed is obtained.

For example, the step that frame hold is performed on a scanned area includes:

Set key points of a character appearance in a picture are traversed for a scanned current frame.

Whether a traversed set key point is fixed is determined.

Whether the traversed set key point is within the scanned area is determined based on a determination result that the traversed set key point is not fixed.

The traversed set key point is fixed based on a determination result that the traversed set key point is within the scanned area.

For example, the set scanning mode includes scanning with one or more of scanning lines.

One scanning line is controlled to scan the image in the picture in a set direction in response to determining the scanning with one scanning line.

A sub-area scanned by each scanning line is determined in response to determining the scanning with the one scanning line, and the plurality of scanning lines are controlled to perform scanning in a set direction and within corresponding sub-areas.

For example, the step that a target morphing point is determined according to the second morphing point and the first morphing point includes:

A virtual standard character appearance is generated according to character appearance information of the character appearance image to be morphed and the character appearance template.

A third morphing point in the virtual standard character appearance is determined.

The target morphing point is determined according to the first morphing point, the second morphing point and the third morphing point.

For example, the character appearance information includes a first eye distance and a first central key point. The step that a virtual standard character appearance is generated according to character appearance information of the character appearance image to be morphed and the character appearance template includes:

A second central key point in the character appearance template is aligned with the first central key point.

According to the first eye distance, an aligned eye distance in the character appearance template is adjusted, and the virtual standard character appearance is obtained.

For example, the step that a third morphing point in the virtual standard character appearance is determined includes:

The third morphing point is determined according to the first central key point, the second central key point, the second morphing point, the first eye distance, and the eye distance in the character appearance template.

For example, the step that the target morphing point is determined according to the first morphing point, the second morphing point and the third morphing point includes:

The target morphing point is determined according to the first morphing point, the second morphing point, the third morphing point, the first eye distance, and the eye distance in the character appearance template.

For example, after the target morphing point is obtained, the method further includes:

An ellipse of a set size is constructed by using the first morphing point as a center;

A point of intersection of a connection line connecting the first morphing point and the target morphing point with the ellipse is obtained to determine the point of intersection as a final target morphing point in response to determining that the target morphing point falls outside the ellipse.

The target morphing point is retained in response to determining that the target morphing point falls within the ellipse.

I claim:

1. A method for generating an effect image, comprising:
 acquiring a character appearance image to be morphed, and a first morphing point in the character appearance image to be morphed;
 acquiring a second morphing point in a character appearance template;
 determining a target morphing point according to the second morphing point and the first morphing point;
 generating a character appearance morphing effect image based on the target morphing point;
 wherein after the target morphing point is obtained, the method further comprises:
 constructing an ellipse of a set size by using the first morphing point as a center;
 obtaining a point of intersection of a connection line connecting the first morphing point and the target morphing point with the ellipse to determine the point of intersection as a final target morphing point in response to determining that the target morphing point falls outside the ellipse; and
 retaining the target morphing point in response to determining that the target morphing point falls within the ellipse.

2. The method of claim 1, wherein acquiring a character appearance image to be morphed comprises:
 scanning an image in a picture according to a set scanning mode in a process of acquiring a character appearance image; and
 performing frame hold on a scanned area until the entire picture is scanned to obtain the character appearance image to be morphed.

3. The method of claim 2, wherein performing frame hold on a scanned area comprises:
 traversing set key points of a character appearance in a picture for a scanned current frame;
 determining whether the traversed set key point is fixed for the traversed set key point;
 determining whether the traversed set key point is within the scanned area based on a determination result that the traversed set key point is not fixed; and
 fixing the traversed set key point based on a determination result that the traversed set key point is within the scanned area.

4. The method of claim 2, wherein the set scanning mode comprises scanning with one or more of scanning lines; and
 scanning an image in a picture in a set scanning mode comprises:
 controlling, in response to determining the scanning with one scanning line, the one scanning line to scan the image in the picture in a set direction; and
 determining, in response to determining the scanning with a plurality of scanning lines, a sub-area scanned by each scanning line to control the plurality of scanning lines to scan the image in the picture in a set direction and within corresponding sub-areas.

5. The method of claim 1, wherein determining a target morphing point according to the second morphing point and the first morphing point comprises:
 generating a virtual standard character appearance according to character appearance information of the character appearance image to be morphed and the character appearance template;

determining a third morphing point in the virtual standard character appearance; and determining the target morphing point according to the first morphing point, the second morphing point and the third morphing point.

6. The method of claim 5, wherein the character appearance information comprises a first eye distance and a first central key point; and generating a virtual standard character appearance according to character appearance information of the character appearance image to be morphed and the character appearance template comprises:

aligning a second central key point in the character appearance template with the first central key point; and adjusting aligned eye distance in the person appearance template according to the first eye distance to obtain the virtual standard person appearance.

7. The method of claim 6, wherein determining a third morphing point in the virtual standard character appearance comprises:

determining the third morphing point according to the first central key point, the second central key point, the second morphing point, the first eye distance, and the eye distance in the character appearance template.

8. The method of claim 6, wherein determining the target morphing point according to the first morphing point, the second morphing point and the third morphing point comprises:

determining target morphing point according to the first morphing point, the second morphing point, the third morphing point, the first eye distance, and the eye distance in the character appearance template.

9. An electronic device, comprising:

one or more processors; and a memory configured to store one or more programs which, when executed by the one or more processors, cause the one or more processors to implement operations, the operations comprising:

acquiring a character appearance image to be morphed, and a first morphing point in the character appearance image to be morphed;

acquiring a second morphing point in a character appearance template;

determining a target morphing point according to the second morphing point and the first morphing point;

generating a character appearance morphing effect image based on the target morphing point;

wherein after the target morphing point is obtained, the operations further comprise:

constructing an ellipse of a set size by using the first morphing point as a center;

obtaining a point of intersection of a connection line connecting the first morphing point and the target morphing point with the ellipse to determine the point of intersection as a final target morphing point in response to determining that the target morphing point falls outside the ellipse; and retaining the target morphing point in response to determining that the target morphing point falls within the ellipse.

10. The electronic device of claim 9, wherein acquiring a character appearance image to be morphed comprises:

scanning an image in a picture according to a set scanning mode in a process of acquiring a character appearance image; and performing frame hold on a scanned area until the entire picture is scanned to obtain the character appearance image to be morphed.

11. The electronic device of claim 10, wherein performing frame hold on a scanned area comprises:

traversing set key points of a character appearance in a picture for a scanned current frame;

determining whether the traversed set key point is fixed for the traversed set key point;

determining whether the traversed set key point is within the scanned area based on a determination result that the traversed set key point is not fixed; and fixing the traversed set key point based on a determination result that the traversed set key point is within the scanned area.

12. The electronic device of claim 10, wherein the set scanning mode comprises scanning with one or more of scanning lines; and scanning an image in a picture in a set scanning mode comprises:

controlling, in response to determining the scanning with one scanning line, the one scanning line to scan the image in the picture in a set direction; and determining, in response to determining the scanning with a plurality of scanning lines, a sub-area scanned by each scanning line to control the plurality of scanning lines to scan the image in the picture in a set direction and within corresponding sub-areas.

13. The electronic device of claim 9, wherein determining a target morphing point according to the second morphing point and the first morphing point comprises:

generating a virtual standard character appearance according to character appearance information of the character appearance image to be morphed and the character appearance template;

determining a third morphing point in the virtual standard character appearance; and determining the target morphing point according to the first morphing point, the second morphing point and the third morphing point.

14. The electronic device of claim 13, wherein the character appearance information comprises a first eye distance and a first central key point; and generating a virtual standard character appearance according to character appearance information of the character appearance image to be morphed and the character appearance template comprises:

aligning a second central key point in the character appearance template with the first central key point; and adjusting aligned eye distance in the person appearance template according to the first eye distance to obtain the virtual standard person appearance.

15. The electronic device of claim 14, wherein determining a third morphing point in the virtual standard character appearance comprises:

determining the third morphing point according to the first central key point, the second central key point, the second morphing point, the first eye distance, and the eye distance in the character appearance template.

16. The electronic device of claim 15, wherein determining the target morphing point according to the first morphing point, the second morphing point and the third morphing point comprises:

determining target morphing point according to the first morphing point, the second morphing point, the third morphing point, the first eye distance, and the eye distance in the character appearance template.

17. A non-transitory computer-readable storage medium, storing a computer program which, when executed by a processor, causes the processor implements operations, the operations comprising:

acquiring a character appearance image to be morphed, and a first morphing point in the character appearance image to be morphed;

acquiring a second morphing point in a character appearance template;

determining a target morphing point according to the second morphing point and the first morphing point;

generating a character appearance morphing effect image based on the target morphing point;

wherein after the target morphing point is obtained, the operations further comprise:

constructing an ellipse of a set size by using the first morphing point as a center;

obtaining a point of intersection of a connection line connecting the first morphing point and the target morphing point with the ellipse to determine the point of intersection as a final target morphing point in response to determining that the target morphing point falls outside the ellipse; and retaining the target morphing point in response to determining that the target morphing point falls within the ellipse.

18. The non-transitory computer-readable storage medium of claim 17, wherein acquiring a character appearance image to be morphed comprises:

scanning an image in a picture according to a set scanning mode in a process of acquiring a character appearance image; and performing frame hold on a scanned area until the entire picture is scanned to obtain the character appearance image to be morphed.

19. The non-transitory computer-readable storage medium of claim 17, wherein determining a target morphing point according to the second morphing point and the first morphing point comprises:

generating a virtual standard character appearance according to character appearance information of the character appearance image to be morphed and the character appearance template;

determining a third morphing point in the virtual standard character appearance; and determining the target morphing point according to the first morphing point, the second morphing point and the third morphing point.

20. The non-transitory computer-readable storage medium of claim 19, wherein the character appearance information comprises a first eye distance and a first central key point; and generating the virtual standard character appearance according to character appearance information of the character appearance image to be morphed and the character appearance template comprises:

aligning a second central key point in the character appearance template with the first central key point; and adjusting aligned eye distance in the person appearance template according to the first eye distance to obtain the virtual standard person appearance.

* * * * *